A. M. BAKEWELL, OF NORMAL, ILLINOIS.

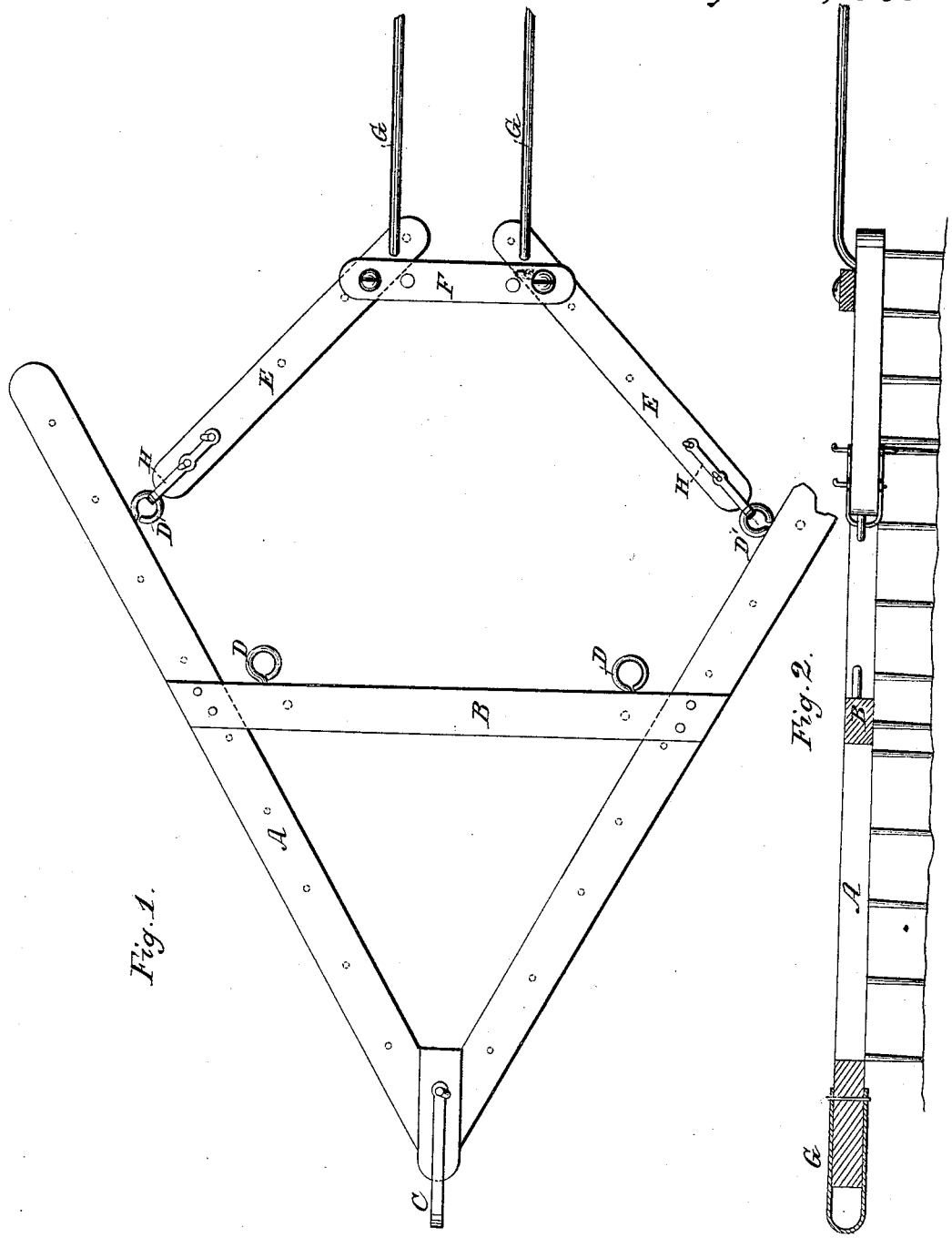

Letters Patent No. 89,192, dated April 20, 1869.

IMPROVEMENT IN HARROW WITH CULTIVATOR-ATTACHMENT.

The Schedule referred to in these Letters Patent and making part of the same.

*To all whom it may concern:*

Be it known that I, A. M. BAKEWELL, of Normal, in the county of McLean, and State of Illinois, have invented a new and useful Improvement in Harrows; and I do hereby declare that the following is a full, clear, and exact description of the same, reference being had to the annexed drawings, making part of this specification, in which—

Figure 1 is a plan view of my improved harrow, showing the cultivator-attachment, and Figure 2 is a side elevation of the same.

Corresponding letters refer to corresponding parts in the two figures.

This invention relates to an improvement in harrows, and

It consists in attaching to an ordinary harrow a movable or changeable attachment, which I term a cultivator, as will be more fully described hereinafter.

A A, in the drawings, represent the sides or arms of an ordinary harrow, which is to be constructed in the form shown, or in any other suitable manner, and is to be provided with a clevis, C, at its front end, for attaching the whiffle-tree thereto. It is further to be provided with teeth, in the usual or any suitable manner, and with the cross-bar or beam B, for supporting the sides A A, and preventing their being forced toward each other in use.

D D represent eye-bolts, which pass through the cross-bar B, and may be secured thereto by being screwed into said bar; or they may extend through the same, and have upon their ends nuts for that purpose.

D' D' represent similar bolts, which may pass through the sides A A, in rear of the cross-bar, and be secured thereto, in the manner above described.

These eye-bolts are for the purpose of providing the means of attaching the cultivator to the harrow.

E E' represent two bars, the forward ends of which are to be supplied with clevises, H, of ordinary construction, for the purpose of securing them to the eye-bolts above described.

These bars are to be of suitable length to permit them to form the required angle, and be connected together, as shown in fig. 1 of the drawings; and they are to be provided with teeth, such as are used in the harrow, or with cultivator-teeth, according to the kind of service required to be done.

These bars may be attached to the sides A A of the harrow by means of the eye-bolts, or, by the same means, to the cross-beam B.

F represents a bar, which is attached to the rear ends of bars E, it being provided with a series of holes, for the purpose of regulating the angles of such bars, to which it is to be secured by means of bolts passing down through the same.

G G represent handles, which are to be secured to the rear ends of the bars E E', and are to have an upward inclination, sufficient to bring their outer and upper ends to the proper elevation to be grasped by the hand of the operator, and thus enable him to control the movements of the cultivator.

H H represent the clevises, which secure the bars E E to the harrow, as shown in fig. 1.

The operation of my device is as follows:

The parts being constructed and arranged as shown, it will be apparent that, by the proper manipulation of the cultivator, the ground between the arms of the harrow may be cultivated in different ways, and to different extents, by changing the position of the cultivator, which is easily effected by means of the handles; and that, when it is desirable to form the earth into beds or ridges, for the purpose of facilitating the drainage thereof, it may be done by placing the cultivator-teeth in the bars E E, and attaching their front ends to the cross-beam B, and spreading their rear ends apart a distance sufficient to cause them to lie in a line parallel with their line of motion, and securing them in that position by means of the cross-bar F.

Having thus fully described my invention,

What I claim, and desire to secure by Letters Patent, is—

1. The combination of the cultivator and harrow, substantially in the manner and for the purpose set forth.

2. The arrangement of the bars E E, cross-bar F, and eye-bolts D D, D' D', as a consequence of which I am enabled to change the position of the bars of the cultivator, substantially as and for the purpose set forth.

3. The combination of the side-bars E E and cross-bar F, substantially as shown and described.

4. The arrangement of the handles G G, with reference to the bars E E, substantially as shown and described.

In testimony whereof, I have signed my name to this specification, in the presence of two subscribing witnesses.

A. M. BAKEWELL.

Witnesses:
  E. W. BAKEWELL,
  THOS. SLADE.